United States Patent
Qu

(10) Patent No.: US 7,197,526 B1
(45) Date of Patent: Mar. 27, 2007

(54) METHOD AND APPARATUS FOR CALCULATING THE REMAINDER OF A MODULO DIVISION

(75) Inventor: Donghui Qu, Shanghai (CN)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/321,611

(22) Filed: May 28, 1999

(51) Int. Cl.
*G06F 7/38* (2006.01)

(52) U.S. Cl. .................. 708/491; 714/808; 714/784
(58) Field of Classification Search .......... 714/808, 714/784; 359/107, 135, 138, 900; 380/30, 380/28; 708/491, 606, 320, 620, 650, 209, 708/653, 655; 710/68; 341/106; 713/180; 358/261.3
See application file for complete search history.

(56) References Cited

U.S. PATENT DOCUMENTS

| | | | | |
|---|---|---|---|---|
| 4,384,341 A | * | 5/1983 | Tague et al. ................. 708/652 |
| 5,199,070 A | * | 3/1993 | Matsuzaki et al. ............ 380/30 |
| 5,724,279 A | * | 3/1998 | Benaloh et al. ............. 708/491 |
| 6,125,380 A | * | 9/2000 | Chung ........................ 708/650 |
| 6,175,850 B1 | * | 1/2001 | Ishii et al. .................. 708/491 |
| 6,275,311 B1 | * | 8/2001 | Boffi ............................ 359/107 |

OTHER PUBLICATIONS

Orton et al. (New fault tolerant techniques for residue number systems; IEEE, pp. 1453–1464; Nov. 1992).*
Stout (Basic Electrical Measurements; 2d Ed., 1960; pp. 82–85.)*
Burgess (Efficient RNS to binary conversion using high-radix SRT division; IEEE; pp. 1240–1243 ; 1–4 Nov. 1998).*
Gala et al. (A high speed VLSI algorithm for A*B modulo N; IEEE, pp. 389–392 vol. 1; Aug. 12–14, 1990).*
Bini et al. (Improved parallel polynomial division and its extensions; IEEE, pp. 131–136; Oct. 24–27, 1992.*
Saha, A et al. (Design and FPGA implementation of efficient integer arithmetic algorithms; IEEE, pp. 4 p; Apr. 4–7, 1993).*

* cited by examiner

*Primary Examiner*—Albert Decady
*Assistant Examiner*—Guy Lamarre

(57) ABSTRACT

A non-iterative technique for calculating the remainder of modulo division, which requires significantly fewer operations than the traditional iterative technique for the same calculation. The number of calculations required in the present invention is independent of the number of bits of the divisor in the modulo operation. Two requirements of the non-iterative technique are that the value of the divisor D should be equal to $2^n-1$ (where n is the number of bits of the divisor D) and the value of the dividend N should be less than or equal to $(D-1)^2$, but greater than or equal to zero. If these two conditions are met, the remainder R of N mod D is determined by summing the upper $$\frac{n}{2}$$

and lower $$\frac{n}{2}$$

bits of the dividend N.

46 Claims, 2 Drawing Sheets

METHOD AND APPARATUS FOR CALCULATING THE REMAINDER OF A MODULO DIVISION

BACKGROUND OF THE INVENTION

1. Field of the Invention

The present invention relates to a method and apparatus for calculating the remainder of a modulo division, and more particularly, to a non-iterative technique for calculating the remainder of a modulo division.

2. Description of the Related Art

Most computer systems require the value modulo n of an integer m, generally written m mod n. M mod n operations are utilized in a number of computer processes, for example, address generating, communication channel load balancing, computer graphics, telephone switching and telephone transmission, packet switching and transmission, and digital message encoding/decoding. Therefore, a routine that accepts integers m and n and produces m mod n is a useful computer tool.

The traditional method of calculating the remainder of modulo division is an iterative algorithm:

$$\frac{N}{D} = Q + \frac{R}{D} \quad (1)$$

where

N is the dividend,

D is the divisor,

Q is the quotient,

R is the remainder, and $0 \leq R < D$.

Assuming Q is an n-bit positive integer, the value of Q can be denoted as a sum of binary positions:

$$Q = \sum_{j=0}^{n-1} Q_j \cdot 2^j \quad (2)$$

where $Q_j$ is the jth bit of Q, $Q_j = \{0,1\}$ for all j

The traditional iterative algorithm begins by initializing R to N, i.e., R(n)=N and initializing $Q_n$ to 1 since N is a positive integer. Then the traditional algorithm calculates R(j) and $Q_j$ for j=(n-1) to j=0 iteratively. The complete algorithm, for dividing an n-bit positive integer N by an n-bit positive integer D resulting in an n-bit positive quotient Q and n-bit positive remainder R, is shown in FIG. 1.

An example of the traditional iterative algorithm is set forth below:

Example 1

Assuming N=25, D=7, and n=3 ⇒ 25 mod 7=4

| | |
|---|---|
| step A1: | $R(3) = 25, Q_3 = 1, j = 2$ |
| step B1: | j < 0 ? No |
| step C1: | $Q_3 = ?$ Yes |
| step D1: | $R(2) = R(3) - D2^J = 25 - (7)(4) = -3$ |
| step E1: | R(2) < 0 ? Yes |
| step F1: | $Q_j = Q_2 = 0$ |
| step G1: | j = j - 1 = 2 - 1 = 1 |
| step B2: | j < 0 ? No |
| step C2: | $Q_2 = 1$ ? No |

-continued

| | |
|---|---|
| step H1: | $R(1) = R(2) + D2^J = -3 + (7)(2) = 11$ |
| step E2: | R(1) < 0 ? No |
| step I1: | $Q_1 = 1$ |
| step G2: | j = j - 1 = 1 - 1 = 0 |
| step B3: | j < 0 ? No |
| step C3: | $Q_1 = 1$ ? Yes |
| step D2: | $R(0) = R(1) - D2^J = 11 - (7)(1) = 4$ |
| step E3: | R(0) < 0 ? No |
| step I2: | $Q_0 = 1$ |
| step G3: | j = j - 1 = 0 - 1 = -1 |
| step B4: | j < 0 ? Yes |
| step J1: | $R = R(-1) = R(0) + (1 - Q_0) \cdot D = 4 + (1 - 1)7 = 4$ |

According to the traditional iterative algorithm, as illustrated in FIG. 1 and Example 1, the remainder of 25 mod 7 is correctly computed to be 4.

The traditional iterative algorithm for determining the remainder of modulo division is a general purpose method, in that any two positive integers may be entered for N and D. However, as illustrated in Example 1, the traditional iterative algorithm requires numerous computations due to its iterative nature. For example, if D is an n-bit integer with a value $D=2^{n-1}$, and n is any positive integer less than or equal to $(D-1)^2$, i.e., n is a 2·n-bit integer at maximum, the traditional iterative method requires 6·n numbers of condition testing, 2·n numbers of multiplications (or shifts) and 2·n additions. Therefore, the total number of operations required is 10·n, excluding any value-assigning operations.

SUMMARY OF THE INVENTION

The present invention is directed to a method and apparatus for calculating the remainder of a modulo division. The present invention is directed to a non-iterative technique for calculating the remainder of modulo division. The present invention requires significantly fewer operations than the traditional iterative technique for the same calculation. Furthermore, the number of calculations requires in the present invention is independent of the number of bits of the divisor in the modulo operation.

Two requirements of the non-iterative technique of the present invention are that the value of the divisor D should be equal to $2^n-1$ (where n is the number of bits of the divisor D) and the value of the dividend N should be less than or equal to $(D-1)^2$, but great than or equal to zero.

Because the two constraints set forth above are basic constraints of Reed-Solomon coding, the present invention is extremely useful in applications that implement Reed-Solomon coding. Reed-Solomon coding involves algebraic operations in a Galois field. Reed-Solomon coding is a type of forward-error correcting coding that is used extensively in data communications. In Reed-Solomon coding, both conditions of the technique of the present invention are met and the algorithm of the present invention greatly improves the Reed-Solomon coding speed. In particular, the present invention is at least four times faster than the traditional iterative algorithm for a 16-bit fixed-point digital signal processor with special instructions supporting iterative division. Furthermore, if the 16-bit fixed-point DSP has no special division instruction, the algorithm of the present invention is at least twelve times faster than the traditional iterative algorithm.

DETAILED DESCRIPTION OF THE PREFERRED EMBODIMENT

Figure 1:
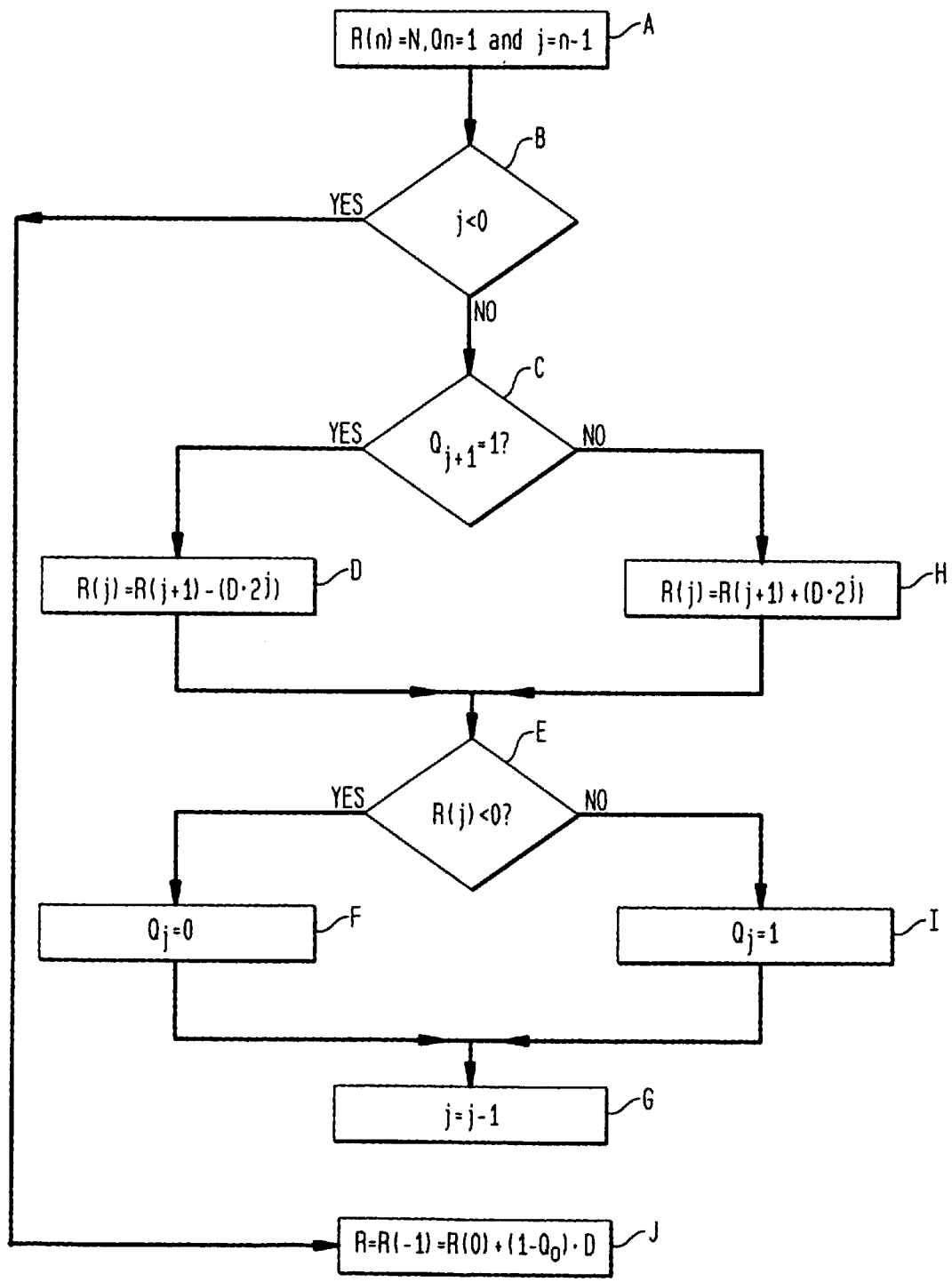
FIG. 1 illustrates a flowchart of the traditional iterative method for determining the remainder of a modulo division.
Figure 2:
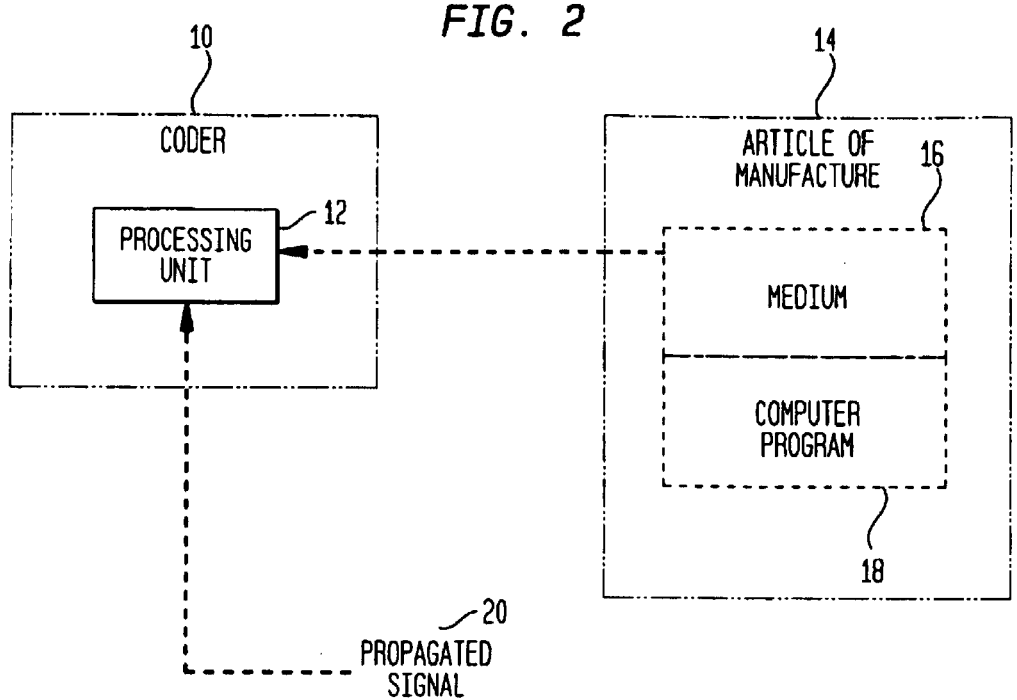
FIG. 2 illustrates a hardware arrangement of the present invention of one embodiment.

FIG. 2 illustrates an apparatus of the present invention in one embodiment. In particular, FIG. 2 illustrates a coder 10, which includes a processing unit 12, which implements the algorithm of the present invention. The processing unit 12, which performs the algorithm of the present invention, may receive a computer program to implement the algorithm of the present invention via an article of manufacture 14 or propagated signal 20. The article of manufacture 14 further includes a medium 16, in addition to the computer program 18.

The processing unit 12 may be any analog or digital processor, and either hardwired or software programmable to carry out the algorithm of the present invention. Processing unit 12 could be a general purpose processor, a digital processor (DSP), an algorithmic logic unit (ALU), or any other processing element, either discrete or integrated, which performs the algorithm to be described below. The coder 10 could be any type of coder which includes the processing unit 12, such as, for example, a Reed-Solomon coder.

The processing unit 12 implements a non-iterative technique for calculating the remainder of modulo division. The number of calculations performed by the processing unit 12 is independent of the number of bits of the divisor in the modulo operation. Two requirements of the non-iterative algorithm of the present invention are that the value of the divisor D should be equal to $2^n-1$ (where n is the number of bits of the divisor D) and the value of the dividend N should be less than or equal to $(D-1)^2$, but greater than or equal to 0. If the two conditions set forth are met, the remainder R of M mod D is determined by summing the upper $$\frac{n}{2}$$

and lower $$\frac{n}{2}$$

bits of the dividend N to produce the remainder R. The two conditions described above enable the processing unit 12 to determine the remainder of a modulo division operation with significantly fewer operations than the traditional iterative technique for the same calculation.

The algorithm of the present invention will now be described in more detail.

For a given dividend N and divisor D, computing N/D gives a quotient Q and remainder R. The relation between these quantities is:

$$\frac{N}{D} = Q + \frac{R}{D} \quad (3)$$

where $$0 \leq R < D$$

Rearrange the equation above gives:

$$N = Q \cdot D + R \quad (4)$$

Equation 4 can be written as $$N = \begin{cases} Q \cdot (D+1) + (R-Q) & \text{if } R \geq Q \\ (Q-1) \cdot (D+1) + [(R-Q) + (D+1)] & \text{else} \end{cases} \quad (5)$$

Equation 5 can be reduced to $$N = Q' \cdot (D+1) + R' \quad (6)$$

where, $$Q' = \begin{cases} Q & \text{if } R \geq Q \\ (Q-1) & \text{else} \end{cases} \quad (7)$$

$$R' = \begin{cases} (R-Q) & \text{if } R \geq Q \\ [(R-Q) + (D+1)] & \text{else} \end{cases}$$

Comparing Equation 4 and Equation 6 it can be seen that Q' and R' are the quotient and remainder of N(mod (D+1)) and Equation 7 gives the relationship between Q, R and Q', R'. Adding Q' and R' gives:

$$Q' + R' = \begin{cases} R & \text{if } R \geq Q \\ R + D & \text{else} \end{cases} \quad (8)$$

Equation 8 shows the sum of Q' and R' can be equal to R or R+D. Given R is a nonnegative integer less than D as shown in Equation 3, R can be obtained by comparing the sum of R' and Q' with D:

$$R = \begin{cases} Q' + R' & \text{if } Q' + R' < D \\ Q' + R' - D & \text{else} \end{cases} \quad (9)$$

If the quotient Q' and remainder R' of N(mod(D+1)) are available, the remainder of N(mod D) can be obtained using Equation (9).

Given the above conclusion, now the question is whether there is an efficient way to calculate the quotient and remainder of N(mod (D+1)). Assuming $D = 2^n - 1$, $$N = \sum_{j=0}^{2 \cdot n - 1} a_j \cdot 2^j$$

where $a^j$ is the jth bit of N, $a^j = \{0,1\}$ for all j then $(D+1) = 2^n$. This fact results in a quick method of obtaining Q' and R'. Assuming $N \leq (D-1)^2$ means N is less than or equal to 2·n bits. The binary representation of N is:

$$N = \left( \sum_{k=0}^{n-1} a_{k+n} \cdot 2^k \right) \cdot 2^n + \sum_{j=0}^{n-1} a_j \cdot 2^j \quad (10)$$

where $$\sum_{k=0}^{n-1} a_{k+n} \cdot 2^k < 2^n \text{ and } \sum_{j=0}^{n-1} a_j \cdot 2^j < 2^n \quad (11)$$

Comparing Equation 6 and Equation 10 and assuming $2^n=(D+1)$, the quotient Q' and remainder R' in Equation 6 can be obtained as:

$$Q' = \sum_{k=0}^{n-1} a_{k+n} \cdot 2^k \text{ where } a_{k+n} \text{ is the } (n+k)th \text{ bit of } N, \quad (12)$$

$$a_{k+n} = \{0, 1\} \text{ for all } k$$

and $$R' = \sum_{j=0}^{n-1} a_j \cdot 2^j \text{ where } a_j \text{ is the } jth \text{ bit of } N, a_j = \{0, 1\} \text{ for all } j$$

Equation (12) means that the quotient Q' and remainder R' of N(mod (D+1)) are the numbers made up by the high and low n bits of N, respectively.

Figure 3:
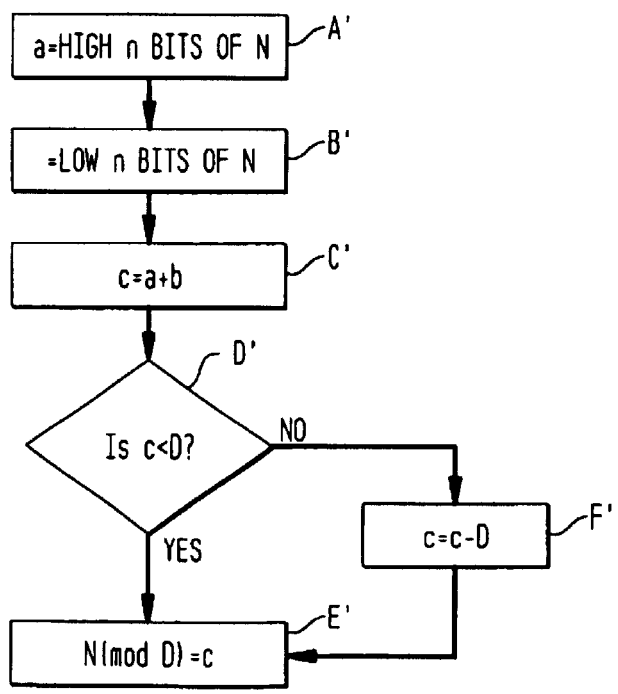
FIG. 3 illustrates a flowchart of the technique of the present invention for determining the remainder of a modulo division.

A flow chart of the present invention is illustrated in FIG. 3. Example 2, set forth below, is explained in conjunction with the flowchart illustrated in FIG. 3.

Example 2

If N=25 and n=3,

| Condition 1: | $D = 2^n - 1 = 7 \Rightarrow$ True |
| --- | --- |
| Condition 2: | $0 \leq N \leq (D - 1)^2$ |
| | $0 \leq 25 \leq 36 \Rightarrow$ True |

$0 \leq 25 \leq 36 \Rightarrow$ True

Assuming N=25, D=7, and n=3 $\Rightarrow$ 25 mod 7=4.
N=25 is represented as a 2n bit number (five bits with a leading zero added)

011:001

| step A': | a = high bits of N → a = 011 |
| --- | --- |
| step B': | b = low n bits of N → b = 001 |
| step C': | c = a + b = 100 |
| step D': | c < D ? Yes |
| step E': | N(mod D) = c = 100 = 4 |

According to the technique of the present invention, the remainder of 25 mod 7 is correctly computed to be 4. Comparing the present invention to the traditional iterative technique, the present invention only requires 5 operations for determining the remainder R, as illustrated in Example 2, whereas the traditional iterative technique, as illustrated in Example 1, requires 21 operations.

Another example illustrates the additional processing performed in step F' of the present invention.

Example 3

If N=15 and n=3,

| Condition 1: | $D = 2^3 - 1 = 7 \Rightarrow$ True |
| --- | --- |
| Condition 2: | $0 \leq N \leq (D - 1)^2$ |
| | $0 \leq 15 \leq 36 \Rightarrow$ True |

Assuming N=15, D=7, and n=3 $\Rightarrow$ 15 mod 7=1
N=15 is represented as a 2n bit number (four bits with two leading zeroes added)

001:111

| step A': | a = high n bits of N → a = 001 |
| --- | --- |
| step B': | b = low n bits of N → b = 111 |
| step C': | c = a + b = 1000 |
| step D': | 1000 < 0111 ? No |
| step F': | c = c − D = 1000 − 0111 = 0001 |
| step E': | N (mod D) = c = 0001 = 1 |

Again, according to the technique of the present invention, the remainder of 15 mod 7 is correctly computed to be 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implementable method of performing modulo division, using a dividend N and an n-bit divisor D to produce a remainder R, said method comprising:

non-iteratively processing N mod D to produce the remainder R, where $D=2^n-1$ and $0<N<(D-1)^2$.

2. The computer-implementable method of claim 1, wherein $n \geq 2$.

3. The computer-implementable method of claim 2, wherein $n \geq 3$.

4. The computer-implementable process of claim 1, further comprising the step of using said remainder R to perform Reed-Solomon coding of data on a computer.

5. The computer-implementable method of claim 1, further the step of summing the upper $$\frac{n}{2}$$

and lower $$\frac{n}{2}$$

bits of the dividend N to produce the remainder R.

6. The computer-implementable method of claim 5, further comprising the step of subtracting the divisor D from the sum to produce the remainder R, if the sum is greater than the divisor D.

7. A computer-implementable method of performing modulo division, using a dividend N and an n-bit divisor D to produce a remainder R, said method comprising:

when $D=2^n-1$ and $0 \leq N \leq (D-1)^2$, performing N mod D to produce the remainder R, where a number of processing operations necessary to produce the remainder R is independent of n.

8. The computer-implementable method of claim 7, wherein $n \geq 2$.

9. The computer-implementable method of claim 8, wherein $n \geq 3$.

10. The computer-implementable process of claim 7, further comprising the step of using said remainder R to perform Reed-Solomon coding of data on a computer.

11. The computer-implementable method of claim 7, further the step of summing the upper $$\frac{n}{2}$$

and lower $$\frac{n}{2}$$

bits of the dividend N to produce the remainder R.

12. The computer-implementable method of claim 11, further comprising the step of subtracting the divisor D from the sum to produce the remainder R, if the sum is greater than the divisor D.

13. A computer-implementable method of performing modulo division, using a dividend N and an n-bit divisor D to produce a remainder R, said method comprising:

when $D=2^n-1$ and $0 \geqq N \geqq (D-1)^2$, summing the upper $$\frac{n}{2}$$

and lower $$\frac{n}{2}$$

bits of the dividend N to produce the remainder R.

14. The computer-implementable method of claim 13, further comprising the step of subtracting the divisor D from the sum to produce the remainder R, if the sum is greater than the divisor D.

15. The computer-implementable method of claim 13, wherein $n \geqq 2$.

16. The computer-implementable method of claim 15, wherein $n \geqq 3$.

17. The computer-implementable process of claim 13, further comprising the step of using said remainder R to perform Reed-Solomon coding of data on a computer.

18. An apparatus for performing modulo division, using a dividend N and an n-bit divisor D to produce a remainder R, said apparatus non-iteratively processing N mod D to produce the remainder R, when $D=2^n-1$ and $0 \leqq N \leqq (D-1)^2$.

19. The apparatus of claim 18, wherein $n \geqq 2$.

20. The apparatus of claim 19, wherein $n \geqq 3$.

21. The apparatus of claim 18, wherein said apparatus is a component of a Reed-Solomon coder.

22. The apparatus of claim 21, wherein said Reed-Solomon coder performs coding in data communication operations.

23. The apparatus of claim 18, further the step of summing the upper $$\frac{n}{2}$$

and lower $$\frac{n}{2}$$

bits of the dividend N to produce the remainder R.

24. The apparatus of claim 23, said apparatus subtracting the divisor D from the sum to produce the remainder R, if the sum is greater than the divisor D.

25. An apparatus for performing modulo division, using a dividend N and an n-bit divisor D to produce a remainder R, said apparatus performing N mod D to produce the remainder R, where a number of processing operations necessary to produce the remainder R is independent of n, when $D=2^n-1$ and $0 \leqq N \leqq (D-1)^2$.

26. The apparatus of claim 25, wherein $n \geqq 2$.

27. The apparatus of claim 26, wherein $n \geqq 3$.

28. The apparatus of claim 25, wherein said apparatus is a component of a Reed-Solomon coder.

29. The apparatus of claim 28, wherein said Reed-Solomon coder performs coding in data communication operations.

30. The apparatus of claim 25, further the step of summing the upper $$\frac{n}{2}$$

and lower $$\frac{n}{2}$$

bits of the dividend N to produce the remainder R.

31. The apparatus of claim 30, said apparatus subtracting the divisor D from the sum to produce the remainder R, if the sum is greater than the divisor D.

32. An apparatus for performing modulo division, using a dividend N and an n-bit divisor D to produce a remainder R, said apparatus summing the upper $$\frac{n}{2}$$

and lower $$\frac{n}{2}$$

bits of the dividend N to produce the remainder R, when $D=2^n-1$ and $0 \leqq N \leqq (D-1)^2$.

33. The apparatus of claim 32, said apparatus subtracting the divisor D from the sum to produce the remainder R, if the sum is greater than the divisor D.

34. The apparatus of claim 32, wherein $n \geqq 2$.

35. The apparatus of claim 34, wherein $n \geqq 3$.

36. The apparatus of claim 32, wherein said apparatus is a component of a Reed-Solomon coder.

37. The apparatus of claim 36, wherein said Reed-Solomon coder performs coding in data communication operations.

38. A computer program embodied in a computer readable medium for performing modulo division, using a dividend N and an n-bit divisor D to produce a remainder R, comprising:

a summing code segment for summing the upper $$\frac{n}{2}$$

and lower $\frac{n}{2}$ bits of the dividend N to produce the remainder R, when $D=2^n-1$ and $0 \leq N \leq (D-1)2$.

39. The computer program of claim 38, further comprising a subtracting code segment for subtracting the divisor D from the sum to produce the remainder R, if the sum is greater than the divisor D.

40. The computer program of claim 38, wherein $n \geq 2$.

41. The computer program of claim 40, wherein $n \geq 3$.

42. A computer signal for performing modulo division, using a dividend N and an n-bit divisor D to produce a remainder R, said computer signal comprising:

a summing code segment for summing the upper $\frac{n}{2}$ and lower $\frac{n}{2}$ bits of the dividend N to produce the remainder R, when $D=2^n-1$ and $0 \leq N \leq (D-1)^2$.

43. The computer signal of claim 42, further comprising a subtracting code segment for subtracting the divisor D from the sum to produce the remainder R, if the sum is greater than the divisor D.

44. The computer signal of claim 42, wherein $n \geq 2$.

45. The computer signal of claim 44, wherein $n \geq 3$.

46. The apparatus of claim 42, said computer signal being executed on a computer to perform Reed-Solomon coding of data.

\* \* \* \* \*